US012599178B2

(12) United States Patent
Lee et al.

(10) Patent No.: US 12,599,178 B2
(45) Date of Patent: Apr. 14, 2026

(54) METHOD AND APPARATUS FOR UNLOCKING AEROSOL GENERATING DEVICE

(71) Applicant: KT&G CORPORATION, Daejeon (KR)

(72) Inventors: Jae Min Lee, Siheung-si (KR); Soung Ho Ju, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 1056 days.

(21) Appl. No.: 16/981,978

(22) PCT Filed: Mar. 16, 2020

(86) PCT No.: PCT/KR2020/003600
§ 371 (c)(1),
(2) Date: Sep. 17, 2020

(87) PCT Pub. No.: WO2020/197142
PCT Pub. Date: Oct. 1, 2020

(65) Prior Publication Data
US 2021/0161210 A1      Jun. 3, 2021

(30) Foreign Application Priority Data
Mar. 22, 2019      (KR) ........................ 10-2019-0033040

(51) Int. Cl.
*A24F 40/50*          (2020.01)
*A24F 40/10*          (2020.01)
(Continued)

(52) U.S. Cl.
CPC ............. *A24F 40/50* (2020.01); *A24F 40/10* (2020.01); *A24F 40/60* (2020.01); *G06F 21/31* (2013.01)

(58) Field of Classification Search
CPC .......... A24F 40/60; A24F 40/10; A24F 40/49; A24F 40/65; G06F 21/31
See application file for complete search history.

(56) References Cited

U.S. PATENT DOCUMENTS

| | | | |
|---|---|---|---|
| 5,847,693 A | 12/1998 | Shima | |
| 6,801,765 B1 | 10/2004 | Roo et al. | |

(Continued)

FOREIGN PATENT DOCUMENTS

| | | |
|---|---|---|
| CN | 1949151 A | 4/2007 |
| CN | 101739527 A | 6/2010 |

(Continued)

OTHER PUBLICATIONS

Extended European Search Report issued Aug. 10, 2021 in European Application No. 20764287.7.

(Continued)

*Primary Examiner* — Michael H. Wilson
*Assistant Examiner* — Stephanie Lynn Moore
(74) *Attorney, Agent, or Firm* — Sughrue Mion, PLLC

(57)                ABSTRACT

Provided is an aerosol generating device including a heater configured to heat an aerosol generating substance after a locking mode is terminated; an output interface configured to output information indicative of switching from the locking mode to a password input mode; an input interface configured to receive at least one user input including a predetermined input waiting time in the password input mode; and a controller configured to terminate the locking mode based on whether the user input matches a password.

6 Claims, 4 Drawing Sheets

(51) Int. Cl.
    *A24F 40/60*       (2020.01)
    *G06F 21/31*       (2013.01)

(56)             References Cited

U.S. PATENT DOCUMENTS

| | | | |
|---|---|---|---|
| 8,294,559 | B2 | 10/2012 | Yoshizawa et al. |
| 2010/0090564 | A1 | 4/2010 | Oh et al. |
| 2015/0089433 | A1 | 3/2015 | Miyamoto |
| 2015/0196057 | A1* | 7/2015 | Wu .................. A24F 40/60 |
| | | | 131/329 |
| 2015/0208729 | A1* | 7/2015 | Monsees ............. A24F 40/42 |
| | | | 131/329 |
| 2016/0029697 | A1 | 2/2016 | Shafer |
| 2016/0106156 | A1 | 4/2016 | Qiu |
| 2017/0135400 | A1 | 5/2017 | Liu |
| 2018/0013175 | A1* | 1/2018 | Liu ...................... H02J 7/00 |
| 2018/0043114 | A1* | 2/2018 | Bowen ............ A61M 11/042 |
| 2018/0084420 | A1 | 3/2018 | Fan et al. |
| 2018/0153219 | A1 | 6/2018 | Verleur et al. |
| 2018/0160734 | A1 | 6/2018 | Batista et al. |
| 2018/0213848 | A1 | 8/2018 | Qiu |
| 2018/0295886 | A1* | 10/2018 | Freeman .......... A61M 15/0065 |
| 2018/0352870 | A1 | 12/2018 | Qiu |
| 2019/0166913 | A1* | 6/2019 | Trzecieski ......... A61M 15/06 |
| 2020/0057844 | A1* | 2/2020 | Ouyang .............. G06F 21/31 |

FOREIGN PATENT DOCUMENTS

| | | | |
|---|---|---|---|
| CN | 202713331 | U | 1/2013 |
| CN | 104461340 | A | 3/2015 |
| CN | 104680049 | A | 6/2015 |
| CN | 105491898 | A | 4/2016 |
| CN | 107505856 | A | 12/2017 |
| EP | 3 120 720 | A1 | 1/2017 |
| IN | 201744033860 | | 6/2018 |
| JP | 2000-010650 | A | 1/2000 |
| JP | 2001-262881 | A | 9/2001 |
| JP | 2003-184375 | A | 7/2003 |
| JP | 2005-42529 | A | 2/2005 |
| JP | 2008-37182 | A | 2/2008 |
| JP | 2011-902 | A | 1/2011 |
| JP | 2018-52297 | A | 4/2018 |
| KR | 19970073203 | A | 11/1997 |
| KR | 1998-0009726 | A | 4/1998 |
| KR | 1020000047514 | A | 7/2000 |
| KR | 20-0330583 | Y1 | 10/2003 |
| KR | 10-2006-0057680 | A | 5/2006 |
| KR | 10-2013-0017468 | A | 2/2013 |
| KR | 101570106 | B1 | 11/2015 |
| KR | 1020160040444 | A | 4/2016 |
| KR | 1020180015622 | A | 2/2018 |

OTHER PUBLICATIONS

Notice of Reasons for Refusal issued Oct. 12, 2021 from the Japanese Patent Office in Japanese Application No. 2020-546943.
Chinese Office Action issued Jul. 13, 2023 in Application No. 202080001754.2.
International Search Report dated Sep. 22, 2020, in International Application No. PCT/KR2020/003600.
Communication dated Sep. 14, 2020 from the Korean Intellectual Property Office in application No. 10-2019-0033040.
Office Action dated Jan. 30, 2023 from the China National Intellectual Property Administration in CN Patent Application No. 202080001754.2.
Chinese Office Action issued Oct. 23, 2023 in Application No. 202080001754.2.

* cited by examiner

【Figure 1】
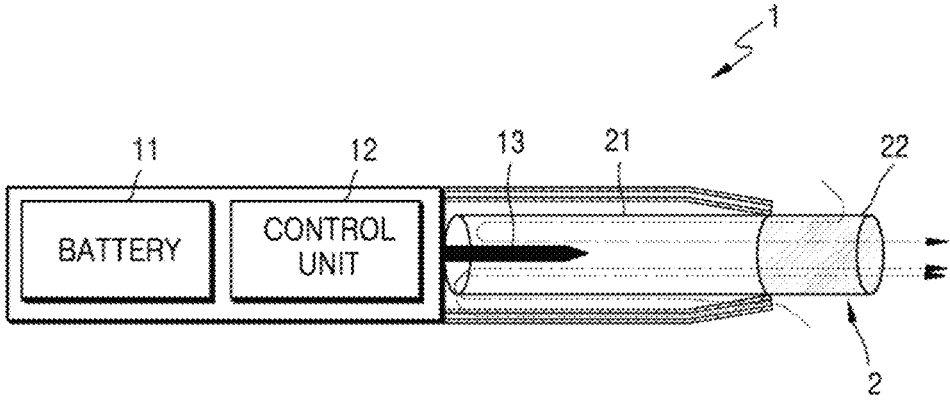
【Figure 2】
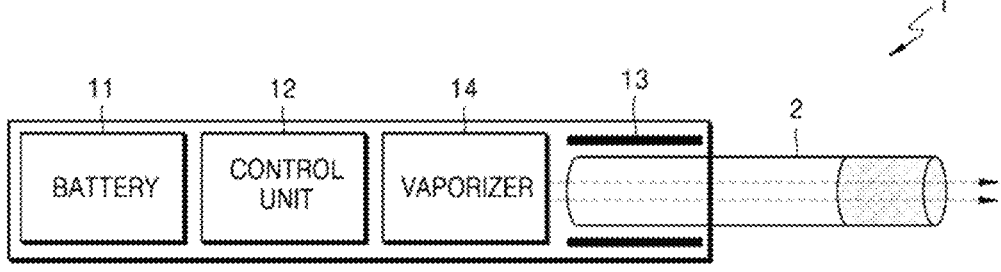
【Figure 3】
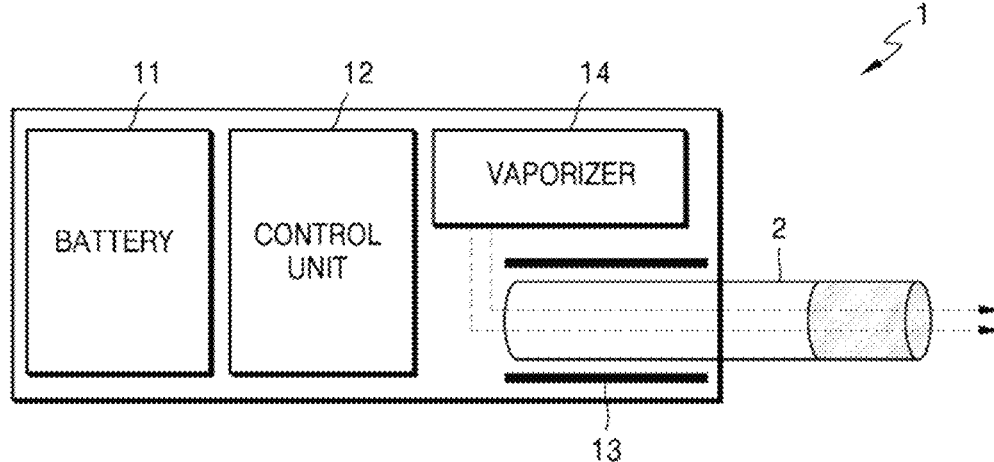

【Figure 4】
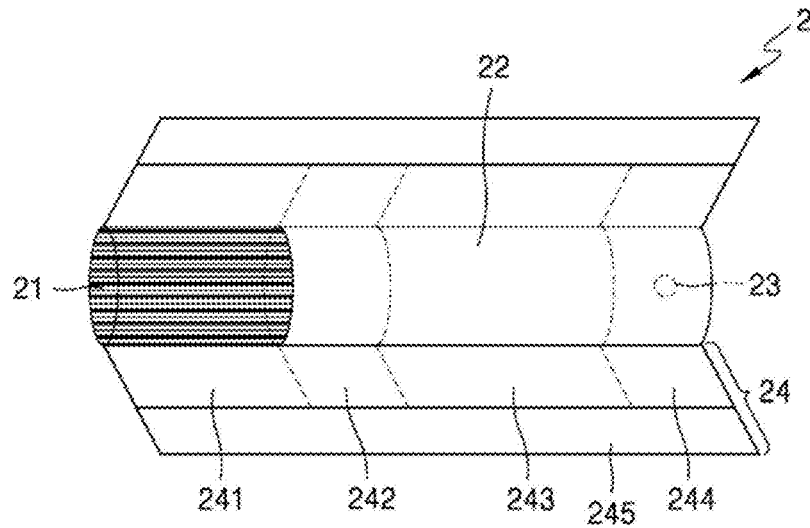
【Figure 5】
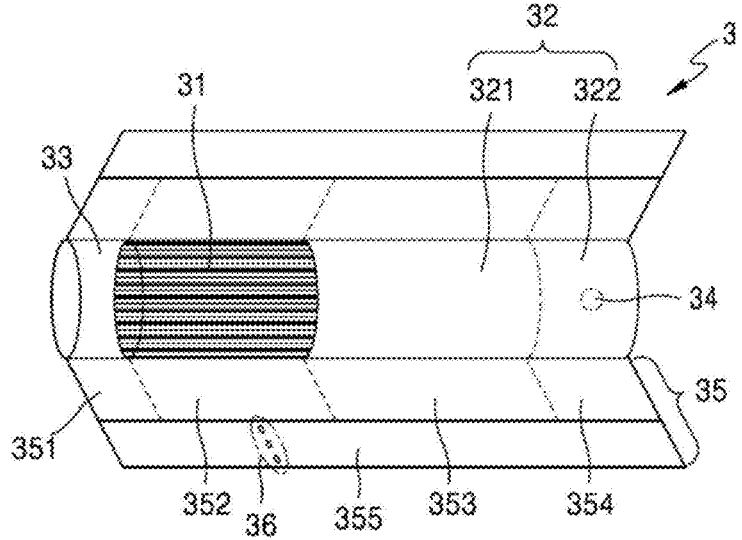

【Figure 6】
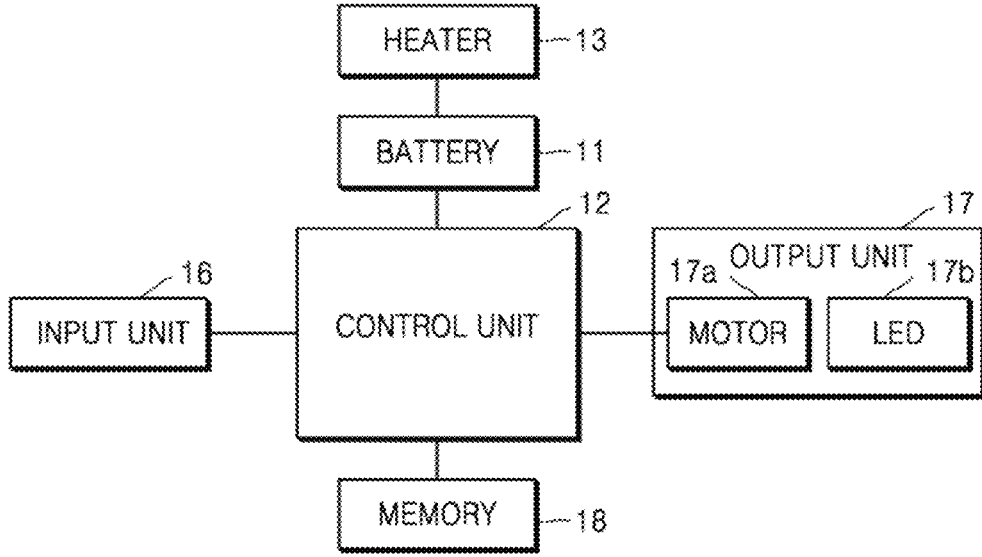
【Figure 7】
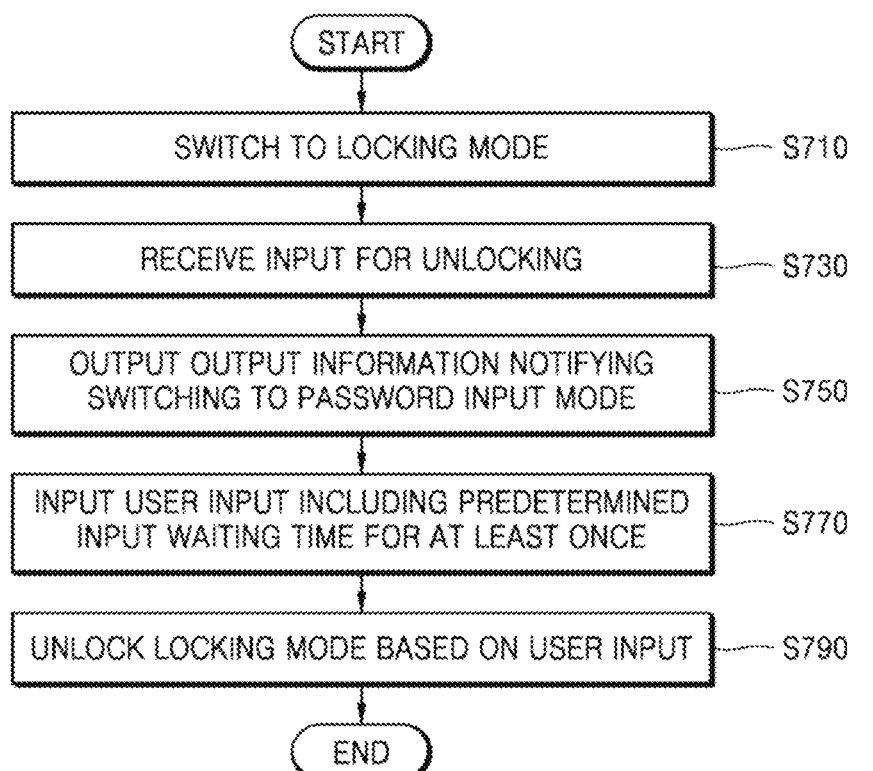

【Figure 8】
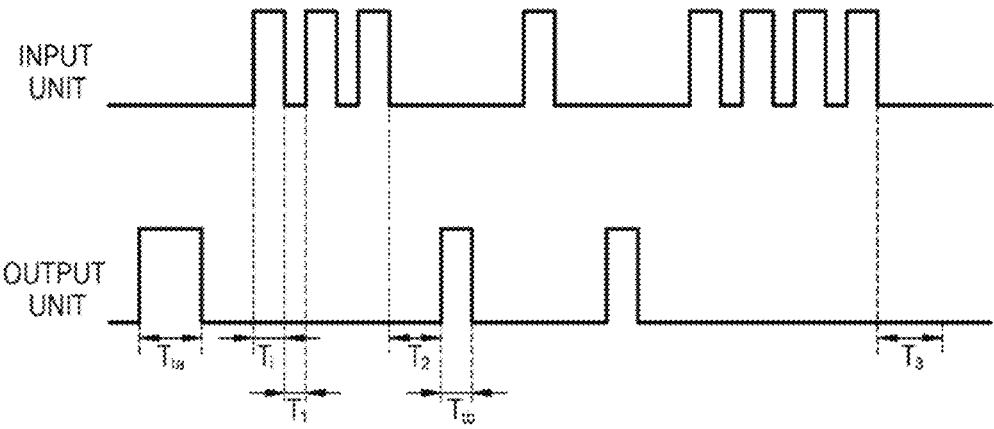
【Figure 9】
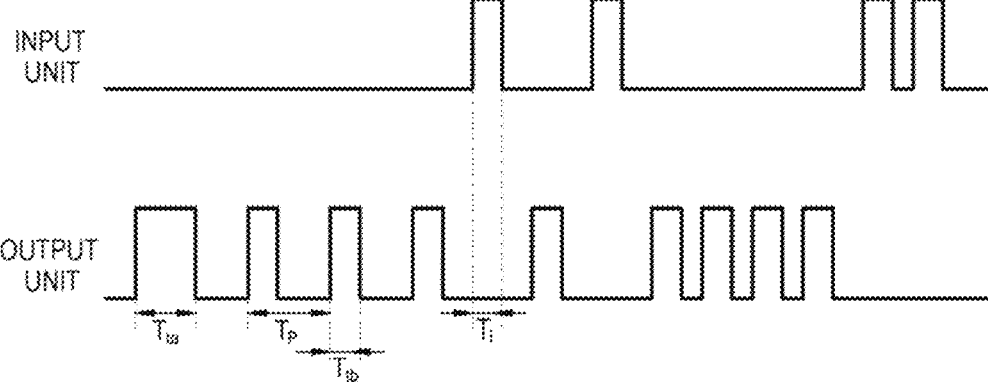

METHOD AND APPARATUS FOR UNLOCKING AEROSOL GENERATING DEVICE

TECHNICAL FIELD

One or more exemplary embodiments relates to a method of unlocking a locking mode of an aerosol generating device and the aerosol generating device, and more particularly, to a method of unlocking a locking mode of an aerosol generating device by using a single input button and the aerosol generating device implemented based on the method.

BACKGROUND ART

Recently, there is a growing demand for alternative methods for resolving problems of a regular combustion-type cigarette. For example, there is a growing demand for a method of generating aerosol by heating an aerosol generating material in a cigarette instead of burning the cigarette to generate aerosol. Therefore, researches on heating-type cigarettes and heating-type aerosol generating apparatuses are being actively carried out.

In general, an aerosol generating device is provided with a single button for ease of use. However, this button only serves to activate a heater when pressed, the aerosol generating device may be used by anyone other than the user.

DISCLOSURE OF INVENTION

Solution to Problem

One or more exemplary embodiments provides a method of unlocking an aerosol generating device based on the number of user inputs for preventing unauthorized use by a user other than an owner even with a single button and an aerosol generating device operating based on the method.

Additional aspects will be set forth in part in the description which follows and, in part, will be apparent from the description, or may be learned by practice of the presented exemplary embodiments of the disclosure.

According to one or more exemplary embodiments, an aerosol generating device includes a heater configured to heat an aerosol generating substance after a locking mode is terminated; an output interface configured to output information indicative of switching from the locking mode to a password input mode; an input interface configured to receive at least one user input including a predetermined input waiting time in the password input mode; and a controller configured to terminate the locking mode based on whether the user input matches a password.

According to one or more exemplary embodiments, a method of unlocking a locking mode of an aerosol generating device, the method includes outputting information indicative of switching to a password input mode from a locking mode; receiving at least one user input including a predetermined input waiting time in the password input mode; and terminating the locking mode based on whether the user input matches a password.

Advantageous Effects of invention

The aerosol generating device of the present invention can unlock the lock mode based on at least one or more user inputs, thereby preventing unauthorized use of another user other than the owner with a single button.

BRIEF DESCRIPTION OF DRAWINGS

FIGS. 1 to 3 are diagrams showing examples in which a cigarette is inserted into an aerosol generating device;

FIGS. 4 and 5 are diagrams showing examples of cigarettes;

FIG. 6 is a schematic internal block diagram of an aerosol generating device according to one or more exemplary embodiments;

FIG. 7 is a flowchart of a method of unlocking a locking mode of an aerosol generating device according to one or more exemplary embodiments;

FIG. 8 is a diagram for describing a method of unlocking a locking mode of an aerosol generating device according to an exemplary embodiment; and FIG. 9 is a diagram for describing a method of unlocking a locking mode of an aerosol generating device according to another exemplary embodiment.

BEST MODE FOR CARRYING OUT THE INVENTION

According to one or more exemplary embodiments, an aerosol generating device includes a heater configured to heat an aerosol generating substance after a locking mode is terminated; an output interface configured to output first output information indicative of switching from the locking mode to a password input mode; an input interface configured to receive at least one user input including a predetermined input waiting time after the first output information is output; and a controller configured to terminate the locking mode based on whether the user input matches a password.

The controller may identify an input digit corresponding to the at least one user input based on a number of consecutive user inputs having an interval less than a first time period.

When no user inputs are received within a second time period, which is longer than the first time period, the controller may output information indicating that the input digit corresponding to the at least one user input is identified.

When no user inputs are received within a third time period, which is longer than the second time period, after a recent user input is received, the controller may terminate the password input mode and terminate the locking mode based on whether input digits identified based on the consecutive user inputs match the password.

After the information indicative of switching to the password input mode, the output interface may output second output information at a predetermined interval, and the controller may identify an input digit corresponding to the at least one user input based on a number of times that the second output information is output before the at least one user input.

The input interface may transmit a first input signal for identifying the input digit of the password and a second input signal for notifying completion of input of the password to the controller.

The controller may count the number of times that the second output information is output until the first input signal is received and determine the counted number of times as the input digit of the password.

According to one or more exemplary embodiments, a method of unlocking an aerosol generating device includes outputting information indicative of switching to a password input mode from a locking mode; receiving at least one user input including a predetermined input waiting time in the password input mode; and terminating the locking mode based on whether the user input matches a password.

The terminating of the locking mode may include identifying an input digit corresponding to the at least one user input based on a number of consecutive user inputs having an interval less than a first time period.

The terminating of the locking mode may further include, when no user inputs are received within a second time period, which is longer than the first time period, outputting information indicating that the input digit corresponding to the at least one user input is identified.

The terminating of the locking mode may further include, when no user inputs are received within a third time period, which is longer than the second time period, after a recent user input is received, terminating the password input mode and determining whether to terminate the locking mode based on whether input digits identified based on the consecutive user inputs match the password.

The outputting of the information may include after the information indicative of switching to a password input mode, outputting second output information at a predetermined interval, and wherein the terminating of the locking mode comprises identifying an input digit corresponding to the at least one user input based on a number of times that the second output information is output before the at least one user input.

The receiving of the user input at least once may include in response to receiving a first user input for inputting the input digit, transmitting a first input signal to a controller; and in response to receiving a second user input notifying completion of input of the password, transmitting a second input signal to the controller.

The terminating of the locking mode may include counting the number of times that the second output information is output until the first input signal is received by the controller; determining the counted number of times as the input digit of the password; and terminating the password input mode when the second input signal is received by the controller.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

With respect to the terms in the various exemplary embodiments, the general terms which are currently and widely used are selected in consideration of functions of structural elements in the various exemplary embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various exemplary embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the exemplary embodiments set forth herein.

Hereinafter, exemplary embodiments of the present disclosure will be described in detail with reference to the drawings.

FIGS. 1 through 3 are diagrams showing examples in which a cigarette is inserted into an aerosol generating device, Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present exemplary embodiment. Therefore, it will be understood by one of ordinary skill in the art related to the present exemplary embodiment that other components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate aerosol from the cigarette 2 and/or the vaporizer 14. The aerosol generated by the heater 13 and/or the vaporizer 14 is delivered to a user by passing through the cigarette 2.

According to necessity, even when the cigarette 2 is not inserted into the aerosol generating device 1, the aerosol generating device 1 may beat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may beat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate the aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1. Otherwise, the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and smoothness of smoke may be adjusted by the user. As another example, the external air may flow into the cigarette 2 through at least one hole formed in a surface of the cigarette 2.

Hereinafter, an example of the cigarette 2 will be described with reference to FIG. 4.

FIG. 4 and FIG. 5 illustrate examples of cigarettes.

Referring to FIG. 4, the cigarette 2 may include a tobacco rod 21 and a filter rod 22, The first portion described above with reference to FIGS. 1 through 3 may include the tobacco rod, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2 may be packaged using at least one wrapper 24. The wrapper 24 may have at least one hole through which external air may be introduced or internal air may be discharged. For example, the cigarette 2 may be packaged using one wrapper 24. As another example, the cigarette 2 may be double-packaged using at least two wrapper 24. For example, the tobacco rod 21 may be packaged using a first wrapper 241, and the filter rod 22 may be packaged using wrappers 242, 243, 244. Also, the entire cigarette 2 may be packaged using a single wrapper 245. When the filter rod 22 includes a plurality of segments, each segment may be packaged using separate wrapper 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which includes tiny bits cut from a tobacco sheet.

The tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity of the tobacco rod may be increased. As a result, the taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film, For example, the capsule 23 may have a spherical or cylindrical shape, but is not limited thereto.

Referring to FIG. 5, the cigarette 3 may further include a front-end plug 33. The front-end plug 33 may be located on a side of the tobacco rod 42, the side not facing the filter rod 32. The front-end plug 33 may prevent the tobacco rod 31 from being detached and prevent the liquefied aerosol from leaking into the aerosol generating device 1 from the tobacco rod 31, during smoking.

The filter rod 32 may include a first segment 321 and second segment 322. Here, the first segment 321 may correspond to a first segment of a filter rod 22 of FIG. 4, and the second segment 322 may correspond to a third segment of a filter rod 22 of FIG. 4.

The diameter and total length of the cigarette 3 may correspond to the diameter and total length of the cigarette 2 of FIG. 4. For example, the length of the front-end plug 33 may be about 7 mm, the length of the tobacco rod 31 may be about 15 mm, the length of the first segment 321 may be about 12 mm, and the length of the second segment 322 may be about 14 mm, but the exemplary embodiments are not limited thereto.

The cigarette 3 may be packaged using at least one wrapper 35. The wrapper 35 may have at least one hole through which external air may be introduced or internal air may be discharged. For example, the front-end plug 33 may be packaged using a first wrapper 351, and the tobacco rod 31 may be packaged using a second wrapper 352, and the first segment 321 may be packaged using a third wrapper 321, and the second segment 322 may be packaged using a fourth wrapper 354. Then, the entire cigarette 3 may be packaged using a fifth wrapper 355.

Also, the fifth wrapper 355 may have at least one hole 36. For example, the hole 36 may be formed in an area surrounding the tobacco rod 31, but is not limited thereto. The hole 36 may serve to transfer heat generated by the heater 13 to the inside of the tobacco rod 31.

Also, the second segment 322 may include at least one capsule 34. Here, the capsule 34 may generate a flavor and/or aerosol. For example, the capsule 34 may have a configuration in which a liquid containing a flavoring material is wrapped with a film. For example, the capsule 34 may have a spherical or cylindrical shape, but is not limited thereto.

FIG. 6 is a schematic internal block diagram of an aerosol generating device according to an exemplary embodiments.

Referring to FIG. 6, an aerosol generating device 1 may include a controller 12, a battery 11, a heater 13, an input interface 16, an output interface 17, and a memory 18.

According to an exemplary embodiment, the aerosol generating device 1 may further include a communication unit (not shown) capable of communicating with an external communication device, such as a user terminal.

According to exemplary embodiments, the aerosol generating device 1 may further include an interface unit (not shown) for connection with a user terminal.

A user terminal may include a desktop computer, a stationary terminal equivalent thereto, and a portable terminal, such as a laptop computer, a tablet, and a mobile phone.

The controller 12 may control overall operations of the battery 11, the heater 13, the input interface 16, the output interface 17, and the memory 18 included in the aerosol generating device 1.

The battery 11 supplies power to the heater 13, and the magnitude of the power supplied to the heater 13 may be adjusted by the controller 12.

The heater 13 generates heat using intrinsic resistance when a current is applied thereto, and the aerosol may be generated when an aerosol generating substance is heated by the heated heater 13.

The controller 12 may control power supplied to the heater 13 by transmitting a pulse width modulation (PWM) signal to the heater 13.

The controller 12 may cut off power supplied to the heater 13 in a locking mode to prevent unauthorized use of other users. In other words, the heater 13 may beat an aerosol generating substance after a locking mode is unlocked.

The controller 12 may supply power to the output interface 17, which will be described below, in a password input mode for unlocking the locking mode.

The input interface 16 may receive a user input at least once. The input interface 16 may be provided in the form of one or more buttons, For example, input interface 16 may be a single button such as a push button or touch button including a touch sensor or a proximity sensor, not being limited thereto.

By using the button, a user may control the aerosol generating device 1 to perform various functions, such as heating the heater 13, entering a password input mode, unlocking the locking mode, etc.

In particular, the input interface 16 may receive a user input during a predetermined input waiting time at least once in the password input mode.

Also, the input interface 16 may store a reference time. Based on a pre-stored reference time, the input interface 16 may generate a short input signal or a long input signal according to the duration of a user input and transmit a generated signal to the controller 12. The reference time stored in the input interface 16 may be changed to a value other than a default value by a user according to exemplary embodiments.

Also, the controller 12 may unlock the locking mode based on a user input. In detail, the controller 12 may receive an input signal generated by a user input and unlock or maintain the locking mode based on a result of analyzing the input signal. For example, the controller 12 may determine whether to unlock the locking mode based on a result of comparing an input signal with previously stored information.

The output interface 17 may output visual information and/or tactile information. To this end, the output interface 17 may include a motor 17a and/or a light emitting diode (LED) 17b. The output interface 17 may also include a speaker (not shown) for outputting auditory information and/or a display for outputting visual information.

The motor 17a may tactilely output various alarm messages generated by the aerosol generating device 1, For example, the motor 17a may be driven by the controller 12 and allow a user to tactilely recognize that the aerosol generating device 1 is ready to be used.

The LED 17b may visually output various alarm messages generated by the aerosol generating device 1. Here, the various alarm messages may include a low battery power message, a heater overheat warning message, etc. Therefore, the user may check an alarm message from the output interface 17 and stop the operation of the aerosol generating device 1 or take an appropriate measure before the aerosol generating device 1 is damaged.

The controller 12 may change not only driving time and the numbers of driving of the motor 17a and the LED 17b, but also output color of the LED 17b. A user may determine a current state of the aerosol generating device 1 based on output patterns of the motor 17a and the LED 17b.

In particular, the output interface 17 may output visual information and/or auditory information to inform the user of switching to the password input mode for unlocking the locking mode.

The memory 18 may store information for the operation of the aerosol generating device 1. For example, the memory 18 may store a temperature profile for the controller 12 to appropriately control power supplied to the heater 13 to provide various flavors to a user of the aerosol generating device 1.

The memory 18 may store a password for terminating the locking mode of the aerosol generating device 1. For example, the password may be a three-digit password.

The aerosol generating device 1 may communicate with a user terminal, and the memory 18 may store a password received from the user terminal. Alternatively, The aerosol generating device 1 may be connected to the user terminal via a wired or wireless interface, and the memory 18 may store a password received from the user terminal.

The controller 12, the input interface 16, the output interface 17, the memory 18, and the vaporizer 14 according to an exemplary embodiment may include at least one processor.

FIG. 7 is a flowchart of a method of unlocking an aerosol generating device according to one or more exemplary embodiments.

Referring to FIG. 7, the aerosol generating device 1 according to one or more exemplary embodiments may be switched to the locking mode (operation S710).

The controller 12 in the aerosol generating device 1 may switch the aerosol generating device 1 to the locking mode when no input signal is received from the input interface 16 during a predetermined locking waiting time. For example, the predetermined locking waiting time may be 24 hours.

In the locking mode, the controller 12 may control the battery 11 to cut off power supplied to the heater 13. However, even in the locking mode, the controller 12 may control the battery 11 to supply power to the input interface 16, the output interface 17, and the memory 18.

The aerosol generating device 1 may receive an input for unlocking (operation S730).

The input interface 16 in the aerosol generating device 1 may receive a user input for unlocking. Since power is supplied to the input interface 16 even in the locking mode, when a user input for unlocking is input, the input interface 16 may transmit an input signal to the controller 12.

For example, the user input for unlocking may be three consecutive short presses on the button. Then, the input interface 16 may transmit three short input signals to the controller 12.

Meanwhile, the above-stated three short input signals are merely an example of user inputs for unlocking, and the exemplary embodiments are not limited thereto. The user input for unlocking may be appropriately set to be distinguished from other user inputs, for example, a user input in S770. However, to prevent a malfunction, the user input for unlocking may include at least two presses on the button.

When a user input for unlocking is received, the output interface 17 in the aerosol generating device 1 may output information indicative of switching to the password input mode (operation S750).

The output information to inform the user of switching to the password input mode may be tactile information or visual information. For example, the motor 17a may vibrate for a predetermined time in response to the user input for unlocking. Also, the LED 17b may blink for a predetermined time in response to the user input for unlocking.

The input interface 16 in the aerosol generating device 1 may receive at least one user input including a predetermined input waiting time (operation S770).

In other words, the controller 12 may identify the number corresponding to the user input based on a user input received within a predetermined time after the previous output signal is output by the output interface 17.

In a first exemplary embodiment of FIG. 8, for the controller 12 to recognize a user input, a first user input corresponding to the first digit of a password needs to be input within an input waiting time after the information to inform the user of switching to the password input mode is output.

Alternatively, in a second exemplary embodiment shown in FIG. 9, for the controller 12 to recognize a user input, the first user input corresponding to the first digit of the password needs to be input within an input waiting time from the output signal that follows the information to inform the user of switching to the password input mode. For example, in FIG. 9, if a user wants to enter input digit "3," a user input of duration Ti needs to be received within input waiting time Tp from the last blink in three consecutive blinks following the information indicative of switching to a password mode.

When the controller 12 does not receive a user input within a predetermined input waiting time, the controller 12 may terminate the password input mode.

When the controller 12 receives a user input within the predetermined input waiting time, the controller 12 may terminate the locking mode based on the user input (operation S790). The controller 12 may determine the digit input by a user based on the number of user inputs, and compare the digit with a password stored in the memory 18, and determine whether to unlock the aerosol generating device 1. Hereinafter, operations S770 to S790 will be described in more detail.

FIG. 8 is a diagram for describing a method of unlocking an aerosol generating device according to an exemplary embodiment.

Referring to FIG. 8, the aerosol generating device 1 may receive a user input for unlocking.

The output interface 17 may output information to inform the user of switching to the password input mode for receiving a password to terminate the locking mode. The information that is output to inform the user of switching to the password input mode may be referred to as first output information. On the other hand, the information that is output to indicate that input digit corresponding to the user input is identified may be referred to as second output information.

An output pattern of outputting first output information and an output pattern of outputting second output information may be different from each other. The output interface 17 may allow a user to distinguish the first output information from the second output information by changing an output time, an output frequency, an output color, etc.

FIG. 8 shows that the output time of the first output information is different from the output time of the second output information. In FIG. 8, the output interface 17 may output the first output information for a time period Tta and output the second output information for a time period Ttb which shorter than the time period Tta.

On the other hand, the first output information and the second output information may be tactile information and/or visual information, and the motor 17a and/or the LED 17b in the output interface 17 may be controlled by the controller 12 accordingly.

The input interface 16 may receive a user input within an input waiting time after the first output information is output. In this case, the user input may be a short input for a time period Ti.

In the password input mode, when a user input is received, the input interface 16 may transmit an input signal to the controller 12. In this case, the input signal may be referred to as a short input signal.

The controller 12 may accumulate the number of times of receiving input signals as long as a subsequent input signal is received within a first time period T1 after a previous input signal is received.

The output interface 17 may output the second output information for distinguishing respective input digits of a password which are input by a user. The second output information may be output when a next input signal is not received after the previous input signal within a second time period T2 greater than the first time period T1.

The controller 12 may calculate the cumulative number of receptions before the second output information is output, and determine the cumulative number as an input digit (i.e., input number) that the user intends to enter.

For example, FIG. 8 shows that an input number corresponding to a first digit of a password is 3. In the same regard, FIG. 8 shows that an input number corresponding to a second digit of the password is 1 and an input number corresponding to a third digit of the password is 4.

Meanwhile, the first time period T1 may be set sufficiently long to distinguish a user input. Also, the second time period T2 may be set sufficiently short to reduce a password inputting time. In other words, the first time period T1 may be set based on the calculation speed of the controller 12, and the second time period T2 may be set based on a total password inputting time.

When the controller 12 does not receive a subsequent input signal within a third time T3 greater than the second time period T2 after a previous input signal is received, the controller 12 may terminate the password input mode.

In another embodiment, when the controller 12 does not receive a subsequent input signal within a third time T3 greater than the second period T2 after the second output information is output, the controller 12 may terminate the password input mode.

The third time T3 needs to be greater than the second time period T2, but may be short enough to reduce a password inputting time. In other words, the third time T3 may also be set based on a total password inputting time.

The controller 12 may determine whether to terminate the locking mode based on the number of times of receptions of the input signal.

The controller 12 may terminate the locking mode when a result of the determination indicates that the number (or numbers) corresponding to the input signals matches a previously stored password.

For example, in FIG. 8, if the previously stored password is 314, the input number corresponding to the first digit of the password is 3, the input number corresponding to the second digit of the password is 1, and the input number corresponding to the third digit of the password is 4, and thus the controller 12 may terminate the locking mode.

Since the aerosol generating device 1 according to the exemplary embodiments determines whether input numbers match a password only after a user completes inputting all the input numbers, the user does not know whether each input number matches a corresponding digit number of the password while the user is inputting the input numbers. As a result, security may be improved.

When the locking mode is terminated, the controller 12 may control the heater 13 to heat the aerosol generating substance based on a user input.

On the other hand, to reset an input number, a user may apply a long input (e.g., a long press on the button) for a time period longer than the time period Ti for short inputs for inputting a password.

When a long input of a user is received, the input interface 16 may transmit a long input signal to the controller 12.

When the controller 12 receives the long input signal, the controller 12 may reset an input number and control the output interface 17 to re-output the output information informing the user of switching to the password input mode.

FIG. 9 is a diagram for describing a method of unlocking an aerosol generating device according to another exemplary embodiment.

Referring to FIG. 9, the aerosol generating device 1 may receive a user input for unlocking.

The output interface 17 may output first output information indicating switching to the password input mode, and then may output second output information at a predetermined interval Tp. It should be noted that the second output information in the exemplary embodiment of FIG. 9 is different from the second output information in the exemplary embodiment of FIG. 8.

An output pattern of outputting first output information and an output pattern of outputting second output information may be different from each other. The output interface 17 may allow a user to distinguish first output information from second output information by changing an output time, an output frequency, an output color, etc.

FIG. 9 shows that the output time of the first output information is different from the output time of the second output information. In FIG. 9, the output interface 17 may output the first output information for the time period Tta and output the second output information for the time period Ttb shorter than the time period Tta.

The first output information and the second output information may be tactile information and/or visual information, and the motor 17a and/or the LED 17b in the output interface 17 may be controlled by the controller 12 accordingly.

The input interface 16 may receive a user input within an input waiting time after the second output information is output. In this case, the user input may be a short input for a time period Ti.

The input interface 16 may receive a first user input for the password and transmit a first input signal to the controller 12. The input interface 16 may receive a second user input for notifying completion of inputting a password and transmit a second input signal to the controller 12. In this case, the first input signal and the second input signal may be referred to as a first short input signal and a second short input signal, respectively.

The controller 12 may distinguish the first input signal and the second input signal based on the number of user inputs. In this case, the number of first input signals may be less than the number of second input signals.

For example, in FIG. 9, the controller 12 may determine one short input of a user as the first input signal and determine two short inputs of a user as the second input signal. To distinguish the first input signal and the second input signal, the interval between the short inputs corresponding to the second input signal may be shorter than $T_p$.

The controller 12 may accumulate the number of outputs second output information until the first input signal is received.

The controller 12 may determine the cumulative output count of the second output information before the first input signal is received as an input number of the password.

For example, FIG. 9 shows that an input number corresponding to a first digit of a password is 3. In the same regard, FIG. 9 shows that an input number corresponding to a second digit of the password is 1 and an input number corresponding to a third digit of the password is 4.

The controller 12 may terminate the password input mode when the second input signal is received.

The controller 12 may determine whether to unlock the locking mode based on the number of times of outputs until the second input signal is received.

The controller 12 may terminate the locking mode when the input numbers match a previously stored password.

For example, in FIG. 9, if the previously stored password is 314, the input number corresponding to the first digit of the password is 3, the input number corresponding to the second digit of the password is 1, and the input number corresponding to the third digit of the password is 4, and thus the controller 12 may terminate the locking mode.

Since the aerosol generating device 1 according to one or more exemplary embodiments determines whether input numbers match a password only after a user completes inputting all the input numbers, the user does not know whether each input number corresponds to a corresponding digit number of the password while the user is inputting the input numbers, and thus security may be improved.

When the locking mode is terminated, the controller 12 may control the heater 13 to heat the aerosol generating substance based on a user input.

On the other hand, to reset an input number, a user may apply a long input for a time period longer than the time period Ti while inputting short inputs for inputting a password.

When a long input of a user is received, the input interface 16 may transmit a long input signal to the controller 12.

When a long input signal is received in the password input mode, the controller 12 may reset an input number and control the output interface 17 to re-output the output the first output information.

As shown in FIGS. 8 to 9, the aerosol generating device 1 according to one or more exemplary embodiments may be unlocked only when a correct password is input, even when the aerosol generating device 1 includes a single input button. Therefore, it is possible to prevent unauthorized use of other users.

At least one of the components, elements, modules or units (collectively "components" in this paragraph) represented by a block in the drawings such as the controller 12, the input interface 16, and the output interface 17 in FIGS. 1-3 and 6, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope of the disclosure as defined by the following claims.

The invention claimed is:

1. An aerosol generating device comprising:
a heater configured to heat an aerosol generating substance after a locking mode is terminated;
an output interface configured to output first output information indicative of switching from the locking mode to a password input mode;
an input interface comprising a single button and configured to receive at least one user input after the first output information is output via the single button; and
a controller configured to:

in the password input mode, identify each input digit of a password composed of multiple digits based on a cumulative number of user inputs received via the single button, wherein each input digit of the password corresponds to a number of consecutive user inputs received within a first time period between each user input, in the password input mode, determine that input of each respective digit is completed when no subsequent user input is received within a second time period, the second time period being greater than the first time period, in the password input mode, determine that input of the password is completed when no subsequent user input is received within a third time period greater than the second time period, and terminate the locking mode based on whether each identified input digit matches a corresponding digit of a stored password, upon determination that the input of the password is completed, wherein the input interface is further configured to receive, in the password input mode, a short input signal for inputting each digit of the password and a long input signal for resetting an inputted digit of the password, and wherein the controller is further configured to control the output interface to re-output the first output information indicative of switching to the password input mode when the long input signal is received.

2. The aerosol generating device of claim 1, wherein, based on no user inputs being received within the second time period, the controller is configured to output second output information indicating that the input digit corresponding to the cumulative user inputs is identified.

3. A method of unlocking an aerosol generating device that includes a heater configured to heat an aerosol generating substance after a locking mode is terminated, an output interface configured to output first output information indicative of switching from the locking mode to a password input mode, and an input interface including a single button and configured to receive at least one user input after the first output information is output via the single button, the method comprising:

outputting, via the output interface, first output information indicative of switching to a password input mode from a locking mode;

receiving at least one user input including a predetermined input waiting time after the first output information is output, the receiving comprising:

in the password input mode, identifying each input digit of a password composed of multiple digits based on a cumulative number of user inputs received via the single button, wherein each input digit of the password corresponds to a number of consecutive user inputs received within a first time period between each user input, in the password input mode, determining that input of each respective digit is completed when no subsequent user input is received within a second time period, the second time period being greater than the first time period, and in the password input mode, determining that input of the password is completed when no subsequent user input is received within a third time period greater than the second time period; and terminating the locking mode based on whether each identified input digit matches a corresponding digit of a stored password, upon determination that the input of the password is completed, wherein the receiving further comprises in the password input mode, receiving, by the input interface, a short input signal for inputting each digit of the password and a long input signal for resetting an inputted digit of the password, and wherein the outputting comprises, based on receiving the long input signal, re-outputting, via the output interface, the first output information indicative of switching to a password input mode from a locking mode.

4. The method of claim 3, wherein the outputting of the information comprises, after the first output information is output, outputting second output information at a predetermined interval, and wherein the terminating of the locking mode comprises identifying an input digit corresponding to the at least one user input based on a number of times that the second output information is output before the at least one user input.

5. The method of claim 4, wherein the receiving of the at least one user input comprises:

in response to receiving a first user input for inputting the input digit, transmitting a first input signal to a controller; and in response to receiving a second user input notifying completion of input of the password, transmitting a second input signal to the controller.

6. The method of claim 5, wherein the terminating of the locking mode comprises:

counting the number of times that the second output information is output until the first input signal is received by the controller;

determining the counted number of times as the input digit of the password; and terminating the password input mode based on the second input signal being received by the controller.

* * * * *